United States Patent
Huang et al.

(10) Patent No.: US 12,204,814 B2
(45) Date of Patent: Jan. 21, 2025

(54) COMPUTER IMPLEMENTED METHOD, DEVICE AND COMPUTER PROGRAM PRODUCT FOR SETTING A PLAYBACK SPEED OF MEDIA CONTENT COMPRISING AUDIO

(71) Applicant: Dolby Laboratories Licensing Corporation, San Francisco, CA (US)

(72) Inventors: Wei Huang, Beijing (CN); Weiwei Wen, Beijing (CN); Bing Lin, Beijing (CN); Yanning Bai, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 148 days.

(21) Appl. No.: 17/791,488

(22) PCT Filed: Jan. 6, 2021

(86) PCT No.: PCT/US2021/012374
§ 371 (c)(1),
(2) Date: Jul. 7, 2022

(87) PCT Pub. No.: WO2021/142035
PCT Pub. Date: Jul. 15, 2021

(65) Prior Publication Data
US 2023/0066854 A1    Mar. 2, 2023

Related U.S. Application Data

(60) Provisional application No. 62/978,477, filed on Feb. 19, 2020.

(30) Foreign Application Priority Data

Feb. 21, 2020   (EP) ..................... 20158755

(51) Int. Cl.
*G06F 3/16*     (2006.01)
*G10L 21/043*   (2013.01)
(Continued)

(52) U.S. Cl.
CPC ............ *G06F 3/165* (2013.01); *G10L 21/043* (2013.01); *G10L 25/51* (2013.01); *G11B 27/005* (2013.01)

(58) Field of Classification Search
CPC ....... G06F 3/165; G10L 21/043; G10L 25/51; G11B 27/005
See application file for complete search history.

(56) References Cited

U.S. PATENT DOCUMENTS 6,760,536 B1   7/2004  Amir
7,152,209 B2   12/2006 Jojic
(Continued)

FOREIGN PATENT DOCUMENTS

| EP | 2552109 A | 1/2013 |
| JP | 09146587 A | 6/1997 |
| KR | 20130099418 A | 9/2013 |

OTHER PUBLICATIONS

A. Singh et al., A neural network based video playback system, 1st India International Conference on Information Processing (IICIP), 2016.
(Continued)

*Primary Examiner* — Joseph Saunders, Jr.

(57) ABSTRACT

A computer implemented method for setting a playback speed of media content comprising audio, the media content having a defined normal playback speed, the method comprising: receiving an indication that the media content is to be played at a speed different from the normal playback speed of the media content, analysing the audio for determining a type of audio; and determining a playback speed
(Continued)

different from the normal playback speed depending on the determined type of audio, and setting the playback speed of the media content to the determined playback speed.

17 Claims, 3 Drawing Sheets

(51) Int. Cl.
*G10L 25/51* (2013.01)
*G11B 27/00* (2006.01)

(56) References Cited

U.S. PATENT DOCUMENTS

| | | | |
|---|---|---|---|
| 7,237,254 | B1 | 6/2007 | Omoigui |
| 7,362,949 | B2 | 4/2008 | Jun |
| 7,796,860 | B2 | 9/2010 | Peker |
| 8,050,541 | B2 | 11/2011 | Gilbert |
| 8,472,791 | B2 | 6/2013 | Gargi |
| 8,849,948 | B2 | 9/2014 | Gilson |
| 8,934,762 | B2 | 1/2015 | Schmit |
| 9,741,392 | B2 | 8/2017 | Ngiam |
| 9,940,968 | B2 | 4/2018 | Srinivasan |
| 10,217,487 | B2 | 2/2019 | Tang |
| 2002/0101368 | A1 | 8/2002 | Choi |
| 2004/0010330 | A1 | 1/2004 | Chen |
| 2006/0080591 | A1 | 4/2006 | Huang |
| 2007/0250311 | A1 | 10/2007 | Shires |
| 2009/0076822 | A1* | 3/2009 | Sanjaume ............... G06F 3/16 704/E13.004 |
| 2011/0307084 | A1* | 12/2011 | Gehring ............... G10H 3/125 700/94 |
| 2014/0277653 | A1 | 9/2014 | Watts |
| 2015/0098691 | A1 | 4/2015 | Avrahami |
| 2015/0237454 | A1 | 8/2015 | Scheirer |
| 2015/0332667 | A1 | 11/2015 | Mason |
| 2017/0004858 | A1 | 1/2017 | Ngiam |
| 2018/0338167 | A1 | 11/2018 | Chi |

OTHER PUBLICATIONS

Jonathan Driedger, "Time-Scale Modification Algorithms for Music Audio Signals", Nov. 3, 2011, XP055690812, URL:https://www.audiolabs-erlangen.de/contenV05-fau/professor/OO-mueller/01-students/2011_DriedgerJonathan_ TSM_MasterThesis.pdf.

Kai-Yin Cheng, SmartPlayer: user-centric video fast-forwarding, CHI '09 Proceedings of the SIGCHI Conference on Human Factors in Computing Systems; pp. 789-798.

Shiping Liu et al., Design and implementation of multimedia player for foreign language learning, Proceedings—2012 IEEE 12th International Conference on Computer and Information Technology, CIT 2012, p. 838-841, 2012.

* cited by examiner

COMPUTER IMPLEMENTED METHOD, DEVICE AND COMPUTER PROGRAM PRODUCT FOR SETTING A PLAYBACK SPEED OF MEDIA CONTENT COMPRISING AUDIO

CROSS-REFERENCE TO RELATED APPLICATIONS

This application claims priority to International Patent Application No. PCT/CN2020/070728, filed on 7 Jan. 2020; U.S. Provisional Patent Application No. 62/978,477, filed on 19 Feb. 2020, and European Patent Application No. 20158755.7, filed on 21 Feb. 2020, each of which is hereby incorporated by reference in its entirety.

TECHNICAL FIELD

The present disclosure relates to playback of media content, and in particular it relates to a computer implemented method, device and computer program product for setting a playback speed of media content comprising audio.

BACKGROUND

Today, changing playback speed of media content is a common feature of modern media player applications (e.g. streaming media applications) on your smart phones, smart TVs, computer etc. For example, content viewers typically uses fast-playback (i.e. a playback speed of >1× of the original speed) to quickly go over media content such as a video, a podcast, an audio book etc. Similarly, sometimes the content viewer reduces the playback speed for different reasons. However, care must be taken such that the change of playback speed does not worsen the user experience to a large extent.

There is thus a need for improvements in this context.

SUMMARY

According to a first aspect of the disclosure, there is provided computer implemented method for setting a playback speed of media content comprising audio, the media content having a defined normal playback speed, the method comprising:
  receiving an indication that the media content is to be played at a speed different from the normal playback speed of the media content,
  analysing the audio for determining a type of audio; and
  determining a playback speed different from the normal playback speed depending on the determined type of audio, and setting the playback speed of the media content to the determined playback speed.

By the term "normal playback speed" should, in the context of present specification, be understood the intended, unadjusted, playback speed of the media content, i.e. 1.0×. In other words, the normal playback speed corresponds to playback of the media content without adjusting the playback speed of the media content. For audio, the normal playback speed corresponds to the sample rate of the recorded audio. For video, the normal playback speed corresponds to the frames per second (FPS) of the recorded video.

Advantageously, the present aspect provides an effect of automatic setting of the playback speed depending on the type of audio. Consequently, the present aspect reduces the need of a user having to change the playback speed when the type of audio changes, thus resulting in a better user experience.

According to some embodiments, determining the playback speed different from the normal playback speed comprises selecting one of one or more predefined playback speeds depending on the determined type of audio.

For example, one or more of the predefined playback speeds may be objectively set, e.g. based on research on how the human hearing system typically works, and what types of audio that a user may hear at which playback speed and still get a good user experience. In other embodiments, one or more of the predefined playback speeds playback speed may be based on user input (e.g. set by the user as a setting to be used for all audio of a specific type in the media content).

According to some embodiments, analysing the audio for determining a type of audio comprises: analysing the audio for determining whether the audio comprises dialogue; and/or analysing the audio for determining whether the audio comprises music.

Advantageously, this embodiment allows for an improved user experience during e.g. a fast playback mode of the media content. Typically, users sometimes find it difficult to understand the dialogue in the media content in case to high playback speed is used. Moreover, in cases where the media content is a movie on a foreign language (for the user) it may be advantageous to lower the playback speed to allow the user to understand the dialogue. For example, if the media content is a movie where dialogue typically is essential to understand the plot of the movie, the determined playback speed for media content comprises such types of audio typically can be lower than if other types of audio is determined. If the media content relates to a music show such as the Eurovision Song Contest or similar, the dialogue may be considered as unimportant and the playback speed for media content comprising such types of audio typically can be set to a relatively higher value. Moreover, for many types of media content, such as movies or talk shows, music is considered less important by a user, and as such, the determined playback speed for media content that comprises such types of audio may be increased.

According to some embodiments, the method further comprises setting the playback speed to a default playback speed if no audio type can be determined. Advantageously, this default playback speed may be a predetermined playback speed used for a fast playback mode of the media content.

According to some embodiments the steps of analysing the audio for determining a type of audio, determining a playback speed different from the normal playback speed depending on the determined type of audio, and setting the playback speed of the media content to the determined playback speed are performed repeatedly while playing the media content.

Advantageously, this allows for automatic run-time adjustments of the playback speed depending on what type(s) of audio is/are currently part of the media content.

According to some embodiments, the method further comprises the steps of:
  selecting one of one or more predefined audio time stretching algorithms depending on the determined type of audio, and
  setting an audio time stretching algorithm of the media content to the selected audio time stretching algorithm.

By the term "audio time stretching algorithm" should, in the context of present specification, be understood an algorithm for changing the speed/duration of audio. The audio time stretching algorithm may or may not be affecting the pitch. The audio time stretching algorithm may be applied in the time domain or in the frequency domain of the audio.

In some cases, a certain audio time stretching algorithm is not suitable or optimal for certain types of audio. For example, an audio time stretching algorithm that allows for pitch scaling of the audio may make dialogue hard to understand (Chipmunk effect). In these embodiments, or in other embodiments where there exist more optimal audio time stretching algorithms for certain types of audio, it may be advantageous to automatically change the audio time stretching algorithm used for the audio of the media content based on the determined type of audio.

According to some embodiments, the method further comprises setting the audio stretching algorithm of the media content to a default audio stretching algorithm if no audio type can be determined. Advantageously, a default audio stretching algorithm may be selected which has an average performance for most audio types.

According to some embodiments, the steps of analysing the audio for determining a type of audio, selecting one of one or more predefined audio time stretching algorithms depending on the determined type of audio, and setting an audio time stretching algorithm of the media content to the selected audio time stretching algorithm are performed repeatedly while playing the media content.

Advantageously, this allows for automatic run-time adjustments of the audio time stretching algorithms depending on what type(s) of audio that is/are currently part of the media content.

According to some embodiments, the step of analysing the audio for determining a type of audio comprises, for at least one type of audio, determining a confidence score relating to that the audio comprising said type of audio, and determining whether the confidence score exceeds a threshold confidence score.

Advantageously, this may increase the flexibility of the method described here.

For example, a used audio analysing method or software may, e.g. for each (or every second, third, fifth, etc.,) audio frame of the audio of the media content, output a confidence value of the audio comprising a certain type of audio, and if any analysed type results in a confidence score above the threshold, it can be considered that the audio comprises that type of audio. If none of output confidence score(s) is/are above the threshold, it can be considered that the audio comprises none of the analysed types of audio. Accordingly, depending on the output confidence score(s), it can be determined which playback speed and optionally audio time stretching algorithm that should be applied. If more than one audio type result in a confidence score above the threshold, a decision can be made based on which audio type resulted in the highest confidence score, or which set of audio types that was considered part of the current audio frame, etc.

In a second aspect, the present disclosure provides a computer program product comprising instructions adapted to carry out the method of the first aspect when executed by a device having processing capability.

In a third aspect, the present disclosure provides a device configured to determine playback speed of media content comprising audio, the device comprising circuitry configured to carry out the method of the first aspect.

The second and third aspect may generally have the same features and advantages as the first aspect.

BRIEF DESCRIPTION OF THE DRAWINGS

The above, as well as additional objects, features and advantages of the present disclosure, will be better understood through the following illustrative and non-limiting detailed description of various embodiments of the present disclosure, with reference to the appended drawings, where the same reference numerals will be used for similar elements, wherein.

DETAILED DESCRIPTION OF EMBODIMENTS

The present disclosure will now be described more fully hereinafter with reference to the accompanying drawings, in which embodiments of the disclosure are shown. The systems and devices disclosed herein will be described during operation.

The present disclosure comes from the realization that many users will speed up the playback of media content to save time, e.g. when trying to get up to speed in a TV serial or a podcast, while for certain types of scenes, the user wants to slow down to not miss anything important. Typically, users must manually select the playback speed. A typical use case is when a user sets the speed to fastest (e.g. 2.0×) for time saving, but when it comes to dialogue conversation scenes, the user might find the audio pitch of the dialogue becomes too high and the audio becomes hard to understand, or that the dialogue is just too fast. Then the user needs to manually adjust the speed back to normal, or some other rate which is not as fast (e.g. 1.5×, or even below the normal playback speed, e.g. 0.75×). When the dialogue ends, the user must manually adjust the speed to the highest again for time-saving. Many users will give up the manual speed adjusting after a while and end up with bad user experience. Similar manual selection of playback speed may be performed for other types of media content, for example when music is played, or when audio of the media content is noisy, etc.

The inventors have realized that users would appreciate a method and device which can automatically adjust the playback speed based a current audio type of the audio of the media content. Based on an audio categorizing mechanism (audio analysing method/software), intelligent and automatic adjustment of the playback speed may be achieved. This will be described in the following.

Figure 1:
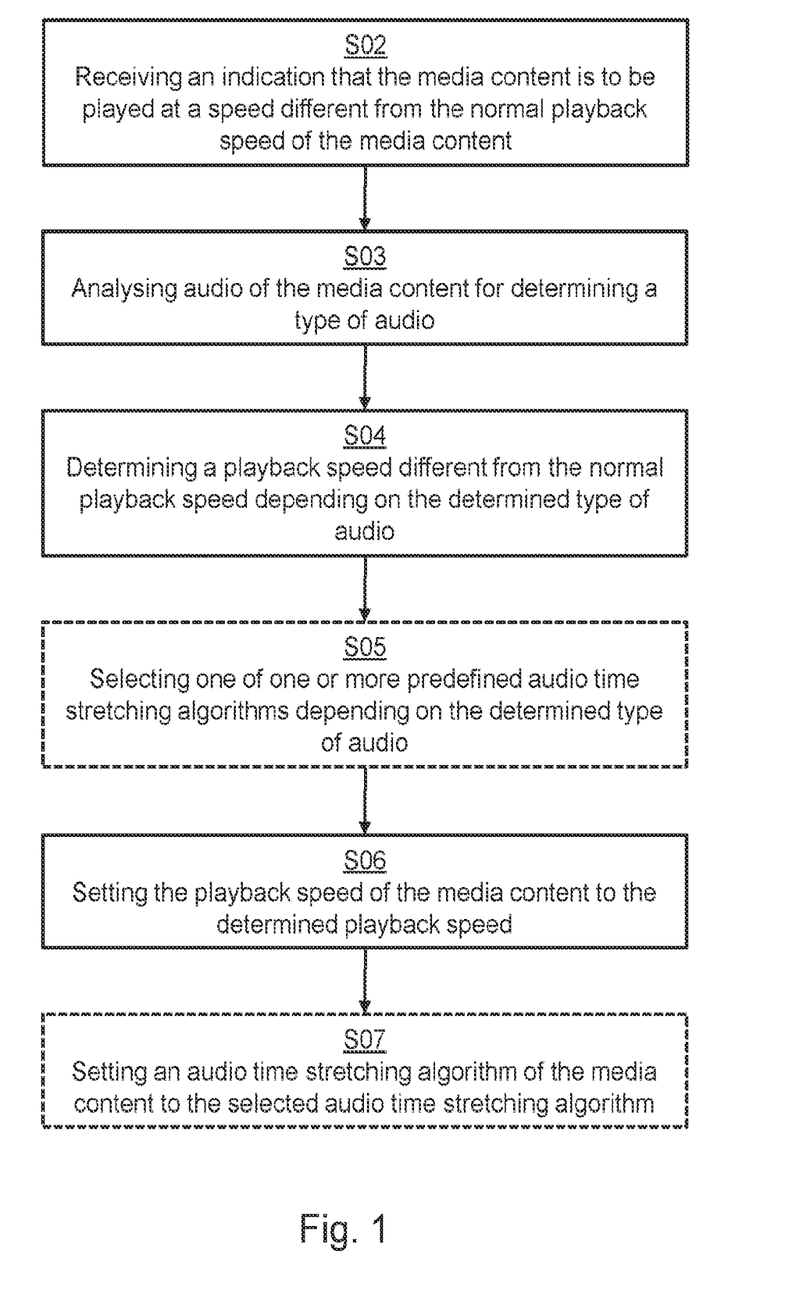
FIG. 1 shows a method for setting a playback speed of media content comprising audio according to embodiments.

FIG. 1 shows by way of example a flow chart for a computer implemented method for setting a playback speed of media content comprising audio. Optionally, the method may also be used for determining an audio time stretching algorithm to be used when the media content is not played in normal speed (1.0×). In FIG. 1, dashed parts are optional.

The method starts by receiving, S02, an indication that the media content is to be played at a speed different from the normal playback speed of the media content. This may be based on user input, e.g. indicating that the media content should be played at a speed exceeding a normal playback speed of the media content (i.e., at a playback speed of >1.0×) or at a speed below the normal playback speed (i.e., at a playback speed of <1.0×).

The next step involves analysing S03 the audio for determining a type of audio. Advantageously this step is done for each audio frame, however, in some embodiments, the analysis is done using audio from a plurality of audio frames, or using a single audio frame and done for every second, third, fifth, etc., audio frame.

The analysis S03 may involve determining at least one from the list of: pitch of the audio, harmonic structure of the audio, zero-crossing rate of the audio, periodicity of the audio, chroma of the audio, spectrum width of the audio, and spectral envelope of the audio.

The analysis S03 may analyse for one or more defined audio types. In the examples herein, dialogue and music are used as examples. For example, characteristics of the audio such as a certain pitch, a certain harmonic structure, a certain linear predictive coding and a certain zero-crossing rate can indicate dialogue. Characteristics of the audio such as a certain duration, a certain periodicity, a certain chroma and a certain spectrum width can indicate a background music. For example, the most distinguished difference between music and dialogue is spectrum width of the audio, wherein music may have a much wider range of spectrum than human voice.

According to some embodiments, the analysing S03 of the audio for determining a type of audio comprises: analysing the audio for determining whether the audio comprises dialogue; and/or analysing the audio for determining whether the audio comprises music. However, it should be noted that the method described herein may be used for other types of audio, e.g. applause, forest sound, a war scene, an erotic scene, noise, VOIP, etc., The step of analysing S03 the audio for determining a type of audio may optionally comprise, for at least one type of audio, determining a confidence score relating to that the audio of the media content comprises said type of audio, and determining that the audio comprises said type of audio when a confidence score exceeds a threshold confidence score. For example, the confidence score may correspond to a 50%, 66%, 75%, etc., certainty that the audio comprises the type of audio. In case more than one audio type results in a confidence score over the threshold confidence score, the audio type resulting in the highest confidence score may be used for adjusting the playback speed and/or the audio time stretching algorithm. In other embodiments, the playback speed and/or the audio time stretching algorithm may be adjusted to values/algorithms targeted to the specific combination of determined audio types with a confidence score above the threshold.

Following the analysis of the audio, a playback speed different from the normal playback speed is determined S04, depending on the determined type of audio. For example, determining S04 the playback speed different from the normal playback speed may comprise selecting one of one or more predefined playback speeds depending on the determined type of audio. The predefined playback speeds may be set based on user input or for instance be set by the content provider (e.g. received in metadata of the media content) or the provider of the software implementing the method discussed herein, e.g. as a hardcoded setting. A predefined playback speed may be based on an AI or machine learning algorithm receiving input from a plurality of users and determining a predefined playback speed for a specific type of audio for certain types of media content (e.g. based on metadata such as content type, length of media content etc.,).

The one or more predefined playback speeds may comprise one playback speed for each possible outcome from the audio analysing step S03. The one or more predefined playback speeds may comprise one playback speed relating to a plurality of outcomes from the audio analysing step S03, and/or a playback speed to be used for types of audio not otherwise mapped to a playback speed among of the one or more predefined playback speeds.

After the playback speed has been determined S04, the method comprises setting S06 the playback speed of the media content to the determined playback speed. Optionally, the playback speed may be set S06 to a default playback speed if no audio type can be determined. The default playback speed may for example be 1.5×, 2.0× or 2.5×. The default playback speed may also be based on (indicated in) metadata of the media content, wherein e.g. the default playback speed differs for different types of media content. The default playback speed may also be based on user input (as further described in conjunction with FIG. 3 below). The default playback speed may be based on an AI or machine learning algorithm receiving input from a plurality of users and determining a preferred default playback speed for certain types of media content (e.g. based on (indicated in) metadata such as content type, length of media content etc.,).

Embodiments of different playback speeds will now be discussed by way of example.

For example, if the audio is determined to comprise dialogue (or likely to comprise dialogue), the playback speed may be changed compared to if the audio does not comprise dialogue, or as compared to a default playback speed. The predefined playback speed used for dialogue may be based on user input (e.g. set by the user as a setting to be used for all dialogue in the media content), or automatically set, for instance depending on metadata of the media content. For example, if the media content is a movie where dialogue may be essential to understand the plot of the movie, the predefined playback speed used for dialogue typically is lower than the default playback speed. If the media content relates to a music show, the dialogue may be considered as unimportant and the predefined playback speed used for dialogue may be higher than the default playback speed. The predefined playback speed used for dialogue may in some cases be lower than the normal playback speed, for example in case the media content is a movie in a foreign language (for the user).

Similar to the discussion relating to dialogue, in some context, it may be beneficial to define a specific playback speed for media content where the audio comprises music. For example, in a movie, scenes where a music track is included as audio may be less important to the plot of the movie and may be played in a higher speed. In other contexts, parts of the media content comprising music as audio are considered equally important as all other parts of the media content not comprising dialogue, or more important than parts of the media content comprising dialogue. A predefined playback speed used for music may be based on user input (e.g. set by the user as a setting to be used for all parts of the media content where the audio comprises music) or be automatically set, for instance depending on (indicated in) metadata of the media content, or be a hardcoded value.

Optionally, also an audio stretching algorithm may be selected S06 depending on the determined type of audio, and set S07 as the audio time stretching algorithm of the media content. As described above, a certain audio time stretching algorithm may not suitable or optimal for certain types of audio. Advantageously, setting S07 the audio time stretching algorithm of the audio depending on the determined type of audio allows for an improved user experience.

Embodiments of audio time stretching algorithms will now be discussed by way of example.

According to some embodiments, a default audio stretching algorithm can be used if no audio type can be determined. The default audio time stretching algorithm may in some embodiments be an algorithm that affects the pitch of the audio, such as a WSOLA algorithm that has an average performance for most audio types. In other embodiments, another algorithm may be used, e.g. a suitable frame-based approach. The default audio time stretching algorithm may be user defined or be automatically set, for instance depending on (indicated in) metadata as discussed above in conjunction with the predefined playback speed. In some embodiments, the default audio time stretching algorithm may be hardcoded and not changeable by the user.

In some cases, the default audio time stretching algorithm is not suitable or optimal for dialog. For example, the default audio time stretching algorithm may allow for pitch scaling of the audio, which makes dialogue hard to understand (Chipmunk effect). In these embodiments, or in other embodiments where there exist more optimal audio time stretching algorithms for dialogue compared to the audio time stretching algorithm used as default audio time stretching algorithm, it may be advantageous to automatically change the audio time stretching algorithm used for the audio of the media content when it is determined that the audio comprises dialogue.

According to some embodiment, upon determining that the audio comprises dialogue in the analysing step S03, the audio time stretching algorithm of the media content is set to a Time-domain pitch-synchronous overlap-and-add, TD-PSOLA, algorithm or a Pointer Interval Controlled Overlap and Add, PICOLA, algorithm. These examples of audio time stretching algorithms have a good performance for changing the playback speed for voices (i.e. dialogue) and still maintain a reasonable understanding of the resulting speed adjusted audio by being specifically designed to maintain the vocal timbre of the dialogue.

According to some embodiment, upon determining that the audio comprises music in the analysing step S03, the audio time stretching algorithm of the media content is set S07 to a predefined audio time stretching algorithm that may allow for pitch change of the audio, which may result in that the rendered audio will sound like the tone of the music is raised (or lowered) by e.g. one octave but where the music still that is clear and smooth. Any suitable audio time stretching algorithm may be used, targeted to adjusted playback speed of music. For example, the predefined audio time stretching algorithm used for music may be a Waveform Similarity based Overlap-Add, WSOLA, algorithm. The WSOLA algorithm has a good performance for changing playback speed of music without resulting in an ambiguous or muffled sound.

According to some embodiments, the predefined audio time stretching algorithm used for music is thus different from predefined audio time stretching algorithm used for dialogue. This allows for an increased flexibility when changing the playback speed of the media content.

As discussed above, the analysing step S03 may output that the audio corresponds to a plurality of types of audio. In these cases, the playback speed and optionally the audio time stretching algorithm may be set accordingly. This will now be exemplified for the case when the audio comprises both dialogue and music. However, other mixes of types of audio are equally possible.

Typically, dialogue may be considered as the most important audio type for a viewer, and consequently, when the audio comprises both dialogue and music, the playback settings for dialogue may be used. As mentioned above, this may be implemented differently for certain types of media content (e.g. based on user preferences or based on metadata of the media content).

Accordingly, in some embodiments, upon determining that the audio corresponds to both dialogue and music in the analysing step S03, the audio time stretching algorithm of the media content is set S07 to a Time-domain pitch-synchronous overlap-and-add, TD-PSOLA, algorithm, or a Pointer Interval Controlled Overlap and Add, PICOLA, algorithm. Similarly, the predefined playback speed used for dialogue may be used also when the audio is determined to comprise both dialogue and music.

In other embodiments, music is considered as the most important audio type, and accordingly, the WSOLA algorithm may be selected as the audio time stretching algorithm, and the predefined playback speed used for music may be used.

According to some embodiments, the steps in FIG. 1, i.e. steps S03, S04, and S06 and optionally steps S05 and S07 are performed repeatedly while playing the media content. In cases where the media content is received as a streaming media transmission, the step of analysing S03 the audio may advantageously be performed in real time. However, as described above, the analysing step S03 needs not to be performed for each audio frame, to reduce the computational power required to perform the method.

Streaming media is video or audio content sent in compressed form over the Internet and played immediately, rather than being saved to the hard drive. Using the method disclosed herein, adjusting the playback speed and/or setting the audio stretching algorithm may thus be performed in real time while streaming which may improve the user experience.

In some embodiments, where the media content is received as a streaming media transmission, the method may further comprise adjusting a streaming speed of the streaming media transmission based on the determined playback speed of the media content. In this way, the required bit rate for the streaming media transmission may be optimized based on the playback speed of the media content.

Figure 2:
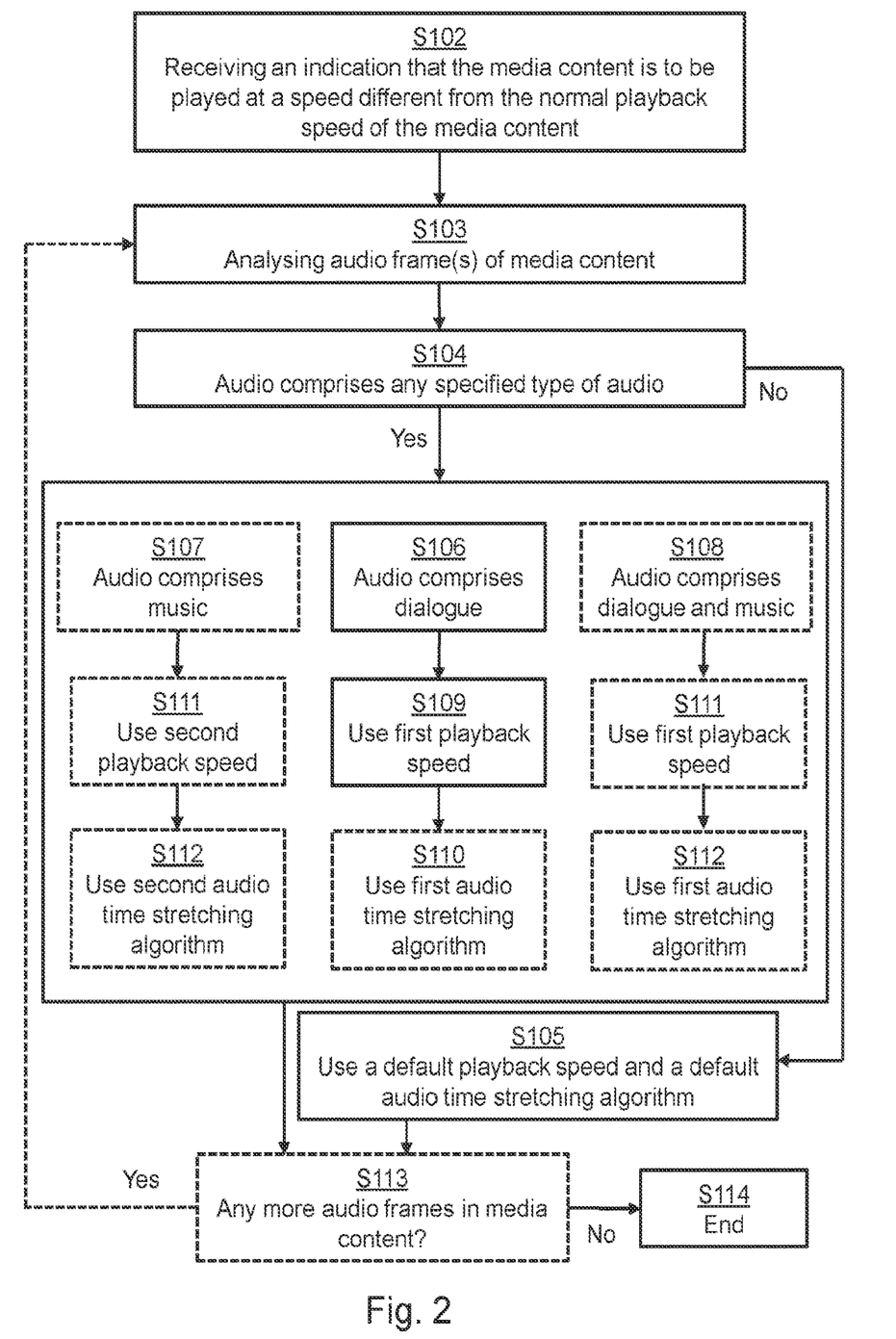
FIG. 2 shows a method for setting a playback speed of media content comprising audio according to embodiments.

FIG. 2 shows, according to embodiments, another flow chart for a method for setting a playback speed of media content comprising audio. Optionally, the method may also be used for determining an audio time stretching algorithm to be used when the media content is not played in normal speed (1.0×). In FIG. 2, dashed parts are optional.

The method starts by receiving S102 an indication that the media content is to be played at a speed different from the normal playback speed of the media content. This may be based on user input, e.g. indicating that the media content should be played at a speed exceeding a normal playback speed of the media content (i.e. at a playback speed of >1.0×).

The next step involves analysing S103 one or more audio frames of the media content for determining a type of audio. Advantageously this step is done for each audio frame individually, however, in some embodiments, the analysis is done using audio from a plurality of audio frames together, or using a single audio frame and done for every second, third, fifth, etc., audio frame.

The analysis S103 may involve determining at least one from the list of: pitch of the audio, harmonic structure of the audio, zero-crossing rate of the audio, periodicity of the audio, chroma of the audio, spectrum width of the audio, and spectral envelope of the audio.

The analysis S103 may analyse for one or more defined audio types. In the examples herein, dialogue and music are used as examples. For example, characteristics of the audio such as a certain pitch, a certain harmonic structure, a certain linear predictive coding and a certain zero-crossing rate can indicate dialogue. Characteristics of the audio such as a certain duration, a certain periodicity, a certain chroma and a certain spectrum width can indicate music.

It should be noted that the method described herein may be used for other types of audio, e.g. applause, forest sound, etc., wherein the method may be adjusted accordingly.

The step of analysing S103 the audio for determining a type of audio may optionally comprise, for at least one type of audio, determining a confidence score relating to that the audio of the media content comprises said type of audio, and determining that the audio comprises said type of audio when a confidence score exceeds a threshold confidence score. For example, the confidence score may correspond to a 50%, 66%, 75%, etc., certainty that the audio comprises the type of audio. In case more than one audio type results in a confidence score over the threshold confidence score, the audio type resulting in the highest confidence score may be used for adjusting the playback speed and/or the audio time stretching algorithm. In other embodiments, the playback speed and/or the audio time stretching algorithm may be adjusted to values/algorithms targeted to the specific combination of determined audio types with a confidence score above the threshold.

If it is determined S104 that the audio does not comprise any of the defined audio type(s), a default playback speed and a default audio time stretching algorithm is used S105. The default playback speed may for example be 1.5×, 2.0× or 2.5×.

The default audio time stretching algorithm may in some embodiments be an algorithm that affects the pitch of the audio, such as a WSOLA algorithm that has an average performance for most audio types.

If, at some point during playback of media content, it is determined S104 that audio to be played comprises any of the defined audio types, the playback speed for playing the media content, and optionally the audio time stretching algorithm used for audio that is played may be adjusted accordingly.

In the example of FIG. 2, the defined audio types comprise at least dialogue and optionally music. However, as clearly pointed out above, this is just by way of example and other/additional types of audio may defined.

In one embodiment, upon determining S106 that the audio comprises dialogue, the method comprises setting S109 the playback speed of the media content to a predefined playback speed (hereinafter referred to as first predefined playback speed) which may be different from the default playback speed. The first predefined playback speed may be lower than the default playback speed. Advantageously, the dialogue may then be easier to understand for a listener/user. In other embodiments, depending on the context, the first predefined playback speed may be higher than the default playback speed, for example if the media content corresponds to a nature documentary or other content where dialogue is considered as unimportant (e.g. media content including moving pictures in which the graphical content is the major incentive).

Optionally, the method comprises, upon determining that the audio comprises dialogue, setting S110 the audio time stretching algorithm used for playback of the media content to a predefined audio time stretching algorithm (hereinafter referred to as first predefined audio time stretching algorithm) which may be different from the default audio time stretching algorithm. Advantageously, the first predefined audio time stretching algorithm may be targeted to dialogue to improve user experience. In some embodiments, the first predefined audio time stretching algorithm is a Time-domain pitch-synchronous overlap-and-add, TD-PSOLA, algorithm, for example a Pointer Interval Controlled Overlap and Add, PICOLA, algorithm.

Optionally, the specified types of audio comprise music, where at least one of the audio time stretching algorithm and the playback speed is changed when the analysed S102 audio frame(s) is/are determined to comprise music. When speeding up media content where the audio comprises music, pitch shifting may advantageously be allowed to improve user experience. Pitch shifting results that the tone of the music is raised/lowered (e.g. by one octave) but the auditory feeling is that the music track with an adjusted playback speed is still clear and smooth. Moreover, for certain media content, music (such as background music) in the audio may indicate either important or less important content. Consequently, the playback speed may also be adjusted.

Accordingly, the method may comprise, upon determining S107 that the audio comprises music, setting S111 the playback speed of the media content to a predefined playback speed (hereinafter referred to as a second predefined playback speed) being different from the first predefined playback speed and/or the default playback speed. Alternatively, or additionally, the method may comprise, upon determining S107 that the audio comprises music, setting S112 the audio time stretching algorithm used for playback of the media content to a predefined audio time stretching algorithm (hereinafter referred to as second predefined audio time stretching algorithm) which may be different from the first predefined audio time stretching algorithm. The second predefined audio time stretching algorithm may also be different from the default audio time stretching algorithm. In other embodiments, the second predefined audio time stretching algorithm is the same as the default audio time stretching algorithm. The second predefined audio time stretching algorithm may in some embodiments be a Waveform Similarity based Overlap-Add, WSOLA, algorithm.

In some embodiments, the method comprises, upon determining S108 that the audio corresponds to both dialogue and music, setting S111 the audio time stretching algorithm used for playback of the media content to the first predefined audio time stretching algorithm, and setting S112 the playback speed of the media content to the first predefined playback speed. In this embodiment, dialogue is considered as more important than music, and the playback speed and audio time stretching algorithm is selected accordingly. In other embodiments (not included in FIG. 2), as discussed above, the audio type resulting in a highest confidence score is used for setting the playback speed and/or audio time stretching algorithm. In yet other embodiments (not included in FIG. 2), music is considered more important than dialogue, and the playback speed and/or audio time stretching algorithm is set accordingly.

As discussed above, the present disclosure may be used in a real time scenario where the playback speed and/or audio time stretching algorithm is continuously updated based on characteristics in the audio of the media content. Consequently, the method of FIG. 2 comprises the step of determining S113 if more audio frames exist in the media content (i.e. the media content being played has not yet ended). In this case, the method is re-iterated by again analysing S103 the audio (i.e. new audio frame(s) in the media content) for determining a type of audio. Otherwise, the method is ended S114.

Figure 3:
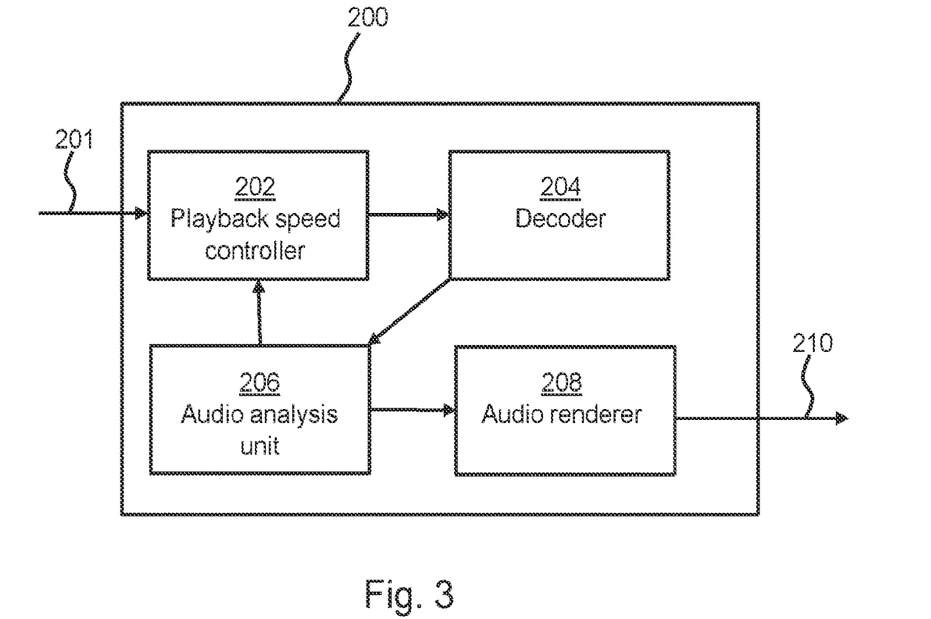
FIG. 3 shows by way of example a device for setting a playback speed of media content comprising audio according to embodiments.

FIG. 3 schematically shows a device 200 implementing the method of FIG. 1 and/or FIG. 2. For example, the device 200 comprises circuitry configured for performing the method of FIG. 1 and/or FIG. 2. The circuitry may comprise one or more processors. Generally, the method of FIG. 1 and/or FIG. 2 may be implemented in the device 200 as software, firmware, hardware or a combination thereof. In FIG. 3, the device comprises a playback speed controller 202. The playback speed controller 202 receives media content 201 comprising audio. The media content 201 may be received in a streaming media transmission, i.e. as streamed media content. The playback speed controller 202 determines a playback speed. The device further comprises a decoder 204 that decodes the media content according to the determined playback speed. The decoded media content is then sent to an audio analysis unit 206 that analyses the audio of the media content and informs the playback speed controller what type(s) of audio is/are currently included in the media content. The playback speed controller 202 is subsequently using the received information from the audio analysis unit 206 to determine a playback speed for the next frame(s) of the media content 201.

In some embodiments, the streaming speed of the streaming media transmission may be adjusted according to the playback speed of the media content. This may be accomplished by the device 200 informing a streaming media provider of the currently applied playback speed, to optimize the bit rate used for transmitting the media content 201 to the device according to the playback speed.

The audio analysis unit 206 may operate in real time, which may be advantageous from a user perspective in the case of streamed media. Consequently, the playback speed and optionally the audio stretching algorithm may be adjusted whenever the type of audio in the media content 201 indicates that this should be done.

Optionally, the audio analysis unit is also informing an audio renderer 208 what type(s) of audio is/are currently included in the media content. The audio renderer 208 then selects a suitable audio time stretching algorithm for rendering and outputting the rendered audio 210 for playback. By putting the audio analysis unit 206 before the audio renderer 208, any interference introduced during pitch changing may be avoided. Consequently, the audio analysis unit 206 will only process the raw audio data to get the score without any possible interference introduced during audio time stretching as an applied audio effect.

Figure 4:
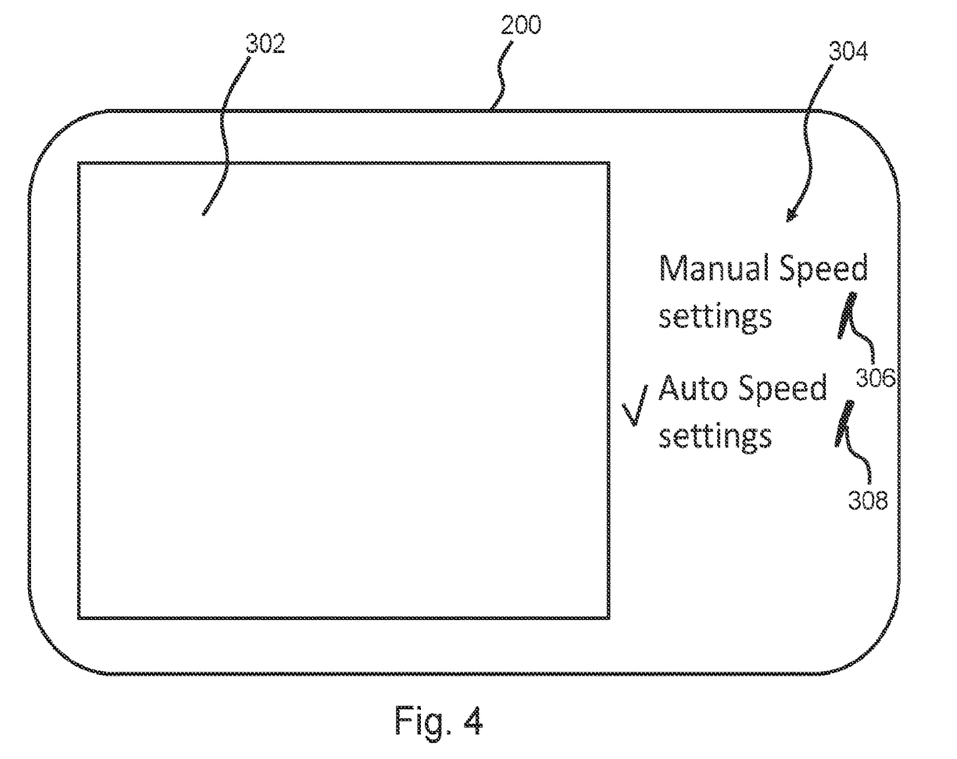
FIG. 4 shows an embodiment of the device of FIG. 3.

FIG. 4 shows by way of example the device 200 of FIG. 3 further comprising means 302 for playback of the media content to a user. The means 302 may comprise a display and/or speaker. The device 200 of FIG. 4 further comprises a user interface 304. Here, a user may select if manual speed settings or automatic speed settings should be used. For each setting (manual or automatic) an edit symbol 306, 308 is included where the user can define e.g. the playback speed to be used. In the manual case, the playback speed selected by the user is directly applied to the media content. In the automatic case, the algorithm described herein is used for determining which playback speed and optionally which audio time stretching algorithm should be applied, based on characteristics of the audio of the media content. In this case, the user interface 304 may be configured for setting at least one of: the first predefined playback speed, the second predefined playback speed, and the default predefined playback speed (e.g. via the edit symbol 308). In some embodiments, also the first/second/default audio time stretching algorithm may be settable by the user. Furthermore, the device 200 may be implemented to present a recommended playback speed and/or audio time stretching algorithm for different types of content. Such recommended playback speed/audio time stretching algorithm may be based on an AI or machine learning algorithm receiving input from a plurality of users and determining a preferred playback speed/audio time stretching algorithm for certain types of media content (e.g. based on metadata such as content type, length of media content etc.,).

By way of example, using the methods/devices/computer program products as described herein, the following scenarios may apply:

When a user set a very fast playback speed (e.g. 2.0×, over a threshold speed), automatically slow down the speed (e.g. 1.5×) when dialogue is detected.

When PICOLA is used as the second predetermined audio time stretching algorithm, automatically switch to WSOLA when the scenario is not dialog.

When a user tries to study a foreign language by watching a foreign TV/movie, slow down the dialogue playback speed to below normal speed (e.g. 0.75×)

When user is watching a music show, speed up (e.g. 2.0×) the dialogue scenario when the judges are commenting, and reset to normal speed (1.0×) or a speed between 1.0× and 2.0× during the music show itself.

when listening to content without video, e.g. podcast and FM, playback speed can be changed according to if dialogue is ongoing or not.

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Various aspects of the present disclosure may be appreciated from the following enumerated example embodiments (EEEs):

EEE 1. A computer implemented method for setting a playback speed of media content comprising audio, the media content having a defined normal playback speed, the method comprising:
   receiving an indication that the media content is to be played at a speed different from the normal playback speed of the media content,
   analysing the audio for determining a type of audio; and
   determining a playback speed different from the normal playback speed depending on the determined type of audio, and setting the playback speed of the media content to the determined playback speed.

EEE 2. A method according to EEE 1, wherein determining the playback speed different from the normal playback speed comprises selecting one of one or more predefined playback speeds depending on the determined type of audio.

EEE 3. A method according to EEE 2, wherein the one or more predefined playback speeds are received in metadata of the media content.

EEE 4. A method according to any one of EEEs 1-3, wherein analysing the audio for determining a type of audio comprises:
   analysing the audio for determining whether the audio comprises dialogue; and/or
   analysing the audio for determining whether the audio comprises music.

EEE 5. A method according to any one of EEEs 1-4, further comprising:
   setting the playback speed to a default playback speed if no audio type can be determined.

EEE 6. A method according to any one of EEEs 1-5, wherein the steps of analysing the audio for determining a type of audio, determining a playback speed different from the normal playback speed depending on the determined type of audio, and setting the playback speed of the media content to the determined playback speed are performed repeatedly while playing the media content.

EEE 7. A method according to any one of EEEs 1-6, further comprising the steps of:
   selecting one of one or more predefined audio time stretching algorithms depending on the determined type of audio, and
   setting an audio time stretching algorithm of the media content to the selected audio time stretching algorithm.

EEE 8. A method according to EEE 7, wherein indications of the one or more predefined audio time stretching algorithms are received in metadata of the media content.

EEE 9. A method according to any one of EEEs 7-8, further comprising:
   setting the audio stretching algorithm of the media content to a default audio stretching algorithm if no audio type can be determined.

EEE 10. A method according to EEE 9, wherein the default audio time stretching algorithm affects a pitch of the audio content.

EEE 11. A method according to any one of EEEs 7-10, wherein, upon determining that the audio comprises dialogue, the audio time stretching algorithm of the media content is set to a Time-domain pitch-synchronous overlap-and-add, TD-PSOLA, algorithm or a Pointer Interval Controlled Overlap and Add, PICOLA, algorithm.

EEE 12. A method according to any one of EEEs 7-11, wherein, upon determining that the audio comprises music, the audio time stretching algorithm of the media content is set to a Waveform Similarity based Overlap-Add, WSOLA, algorithm.

EEE 13. A method according to any one of EEEs 7-12, wherein upon determining that the audio corresponds to both dialogue and music, the audio time stretching algorithm of the media content is set to a Time-domain pitch-synchronous overlap-and-add, TD-PSOLA, algorithm, or a Pointer Interval Controlled Overlap and Add, PICOLA, algorithm.

EEE 14. A method according to any one of EEEs 7-13, wherein the steps of analysing the audio for determining a type of audio, selecting one of one or more predefined audio time stretching algorithms depending on the determined type of audio, and setting an audio time stretching algorithm of the media content to the selected audio time stretching algorithm are performed repeatedly while playing the media content.

EEE 15. A method according to any one of EEEs 1-14, wherein the step analysing the audio for determining a type of audio comprises, for at least one type of audio, determining a confidence score relating to that the audio comprising said type of audio, and determining whether the confidence score exceeds a threshold confidence score.

EEE 16. A method according to any one of EEEs 1-15, further comprising the step of receiving the media content as a streaming media transmission, wherein the step of analysing the audio is performed in real time.

EEE 17. A method according to any one of EEEs 1-16, further comprising the steps of:
   receiving the media content as a streaming media transmission
   adjusting a streaming speed of the streaming media transmission based on the determined playback speed of the media content.

EEE 18. A computer program product comprising instructions adapted to carry out the method of any one of EEEs 1-17 when executed by a device having processing capability.

EEE 19. A computer readable storage medium storing the computer program product of EEE 18.

EEE 20. A device configured to set the playback speed of media content comprising audio, the device comprising circuitry configured to carry out the method of any one of EEEs 1-17 for setting said playback speed.

The invention claimed is:

1. A computer implemented method for setting a playback speed of media content comprising audio, the media content having a defined normal playback speed, the method comprising:
   receiving an indication that the media content is to be played at a speed different from the normal playback speed of the media content;
   analysing the audio for determining a type of audio;
   determining a playback speed different from the normal playback speed depending on the determined type of audio; and
   setting the playback speed of the media content to the determined playback speed, wherein setting the playback speed of the media content to the determined playback speed includes:
   selecting one of one or more predefined audio time stretching algorithms depending on the determined type of audio, and
   setting an audio time stretching algorithm of the media content to the selected audio time stretching algorithm,
wherein indications of the one or more predefined audio time stretching algorithms are received in metadata of the media content.

2. A method according to claim 1, wherein determining the playback speed different from the normal playback speed comprises selecting one of one or more predefined playback speeds depending on the determined type of audio.

3. A method according to claim 2, wherein the one or more predefined playback speeds are received in metadata of the media content.

4. A method according to claim 1, wherein analysing the audio for determining a type of audio comprises:
   analysing the audio for determining whether the audio comprises dialogue; and/or
   analysing the audio for determining whether the audio comprises music.

5. A method according to claim 1, further comprising:
   setting the playback speed to a default playback speed if no audio type can be determined.

6. A method according to claim 1, wherein the steps of analysing the audio for determining a type of audio, determining a playback speed different from the normal playback speed depending on the determined type of audio, and setting the playback speed of the media content to the determined playback speed are performed repeatedly while playing the media content.

7. A method according to claim 1, further comprising:
   setting the audio stretching algorithm of the media content to a default audio stretching algorithm if no audio type can be determined.

8. A method according to claim 7, wherein the default audio time stretching algorithm affects a pitch of the audio content.

9. A method according to claim 1, wherein, upon determining that the audio comprises dialogue, the audio time stretching algorithm of the media content is set to a Time-domain pitch-synchronous overlap-and-add, TD-PSOLA, algorithm or a Pointer Interval Controlled Overlap and Add, PICOLA, algorithm.

10. A method according to claim 1, wherein, upon determining that the audio comprises music, the audio time stretching algorithm of the media content is set to a Waveform Similarity based Overlap-Add, WSOLA, algorithm.

11. A method according to claim 1, wherein upon determining that the audio corresponds to both dialogue and music, the audio time stretching algorithm of the media content is set to a Time-domain pitch-synchronous overlap-and-add, TD-PSOLA, algorithm, or a Pointer Interval Controlled Overlap and Add, PICOLA, algorithm.

12. A method according to claim 1, wherein the steps of analysing the audio for determining a type of audio, selecting one of one or more predefined audio time stretching algorithms depending on the determined type of audio, and setting an audio time stretching algorithm of the media content to the selected audio time stretching algorithm are performed repeatedly while playing the media content.

13. A method according to claim 1, wherein the step of analysing the audio for determining a type of audio comprises, for at least one type of audio, determining a confidence score relating to that the audio comprising said type of audio, and determining whether the confidence score exceeds a threshold confidence score.

14. A method according to claim 1, further comprising the step of receiving the media content as a streaming media transmission, wherein the step of analysing the audio is performed in real time.

15. A method according to claim 1, further comprising the steps of:
   receiving the media content as a streaming media transmission
   adjusting a streaming speed of the streaming media transmission based on the determined playback speed of the media content.

16. A non-transitory computer readable storage medium storing instructions adapted to carry out the method of claim 1 when executed by a device having processing capability.

17. A device configured to set the playback speed of media content comprising audio, the device comprising circuitry configured to carry out the method of claim 1 for setting said playback speed.

* * * * *

UNITED STATES PATENT AND TRADEMARK OFFICE
CERTIFICATE OF CORRECTION

PATENT NO. : 12,204,814 B2  
APPLICATION NO. : 17/791488  
DATED : January 21, 2025  
INVENTOR(S) : Huang et al.

Page 1 of 1

It is certified that error appears in the above-identified patent and that said Letters Patent is hereby corrected as shown below:

On the Title Page

Column 1, (30) FOREIGN APPLICATION PRIORITY DATA:
After "20158755", insert --¶Jan. 7, 2020 (CN) PCT/CN2020/070728--

Signed and Sealed this  
First Day of April, 2025

Coke Morgan Stewart  
*Acting Director of the United States Patent and Trademark Office*